United States Patent [19]
Salter

[11] Patent Number: 5,159,654
[45] Date of Patent: Oct. 27, 1992

[54] MULTI-CHANNEL OPTICAL FIBER CONNECTOR

[75] Inventor: James R. Salter, The Woodlands, Tex.

[73] Assignee: Optex Biomedical, Inc., The Woodlands, Tex.

[21] Appl. No.: 782,557

[22] Filed: Oct. 25, 1991

[51] Int. Cl.[5] .............................................. G02B 6/26
[52] U.S. Cl. .................................... 385/59; 385/55; 385/12; 385/65; 385/71; 385/139
[58] Field of Search .................... 385/54, 55, 59, 71, 385/65, 12, 136, 137; 250/227.11, 227.14; 356/40, 41, 39

[56] References Cited

U.S. PATENT DOCUMENTS

| | | | |
|---|---|---|---|
| 4,016,761 | 4/1977 | Rozzell et al. | 250/227.11 |
| 4,140,367 | 2/1979 | Makuch et al. | 385/59 |
| 4,214,812 | 7/1980 | de Mendez | 385/65 |
| 4,277,135 | 7/1981 | Schrott et al. | 385/75 |
| 4,279,468 | 7/1981 | Turley et al. | 385/59 |
| 4,323,300 | 4/1982 | Stewart et al. | 385/59 |
| 4,405,201 | 9/1983 | Cefarelli et al. | 385/59 |
| 4,611,877 | 9/1986 | Glover et al. | 385/71 |
| 4,684,245 | 8/1987 | Goldring | 356/41 |
| 4,697,593 | 10/1987 | Evans et al. | 356/41 |
| 4,756,597 | 7/1988 | Hahn et al. | 385/117 |
| 4,759,599 | 7/1988 | Yamaguchi et al. | 385/59 |
| 4,778,243 | 10/1988 | Finzel | 385/55 |
| 4,779,952 | 10/1988 | Hayashi et al. | 385/66 |
| 4,794,619 | 12/1988 | Tregay | 385/12 |
| 4,818,059 | 4/1989 | Kakii et al. | 385/65 |
| 4,822,997 | 4/1989 | Fuller et al. | 250/227.11 |
| 4,824,204 | 4/1989 | Pafford | 385/73 |
| 4,836,638 | 6/1989 | Finzel | 385/59 |
| 4,872,736 | 10/1989 | Myers et al. | 385/60 |
| 4,892,383 | 1/1990 | Klainer et al. | 385/12 |
| 4,906,837 | 3/1990 | Doneen et al. | 385/12 X |
| 4,907,857 | 3/1990 | Giuliani et al. | 385/12 |
| 4,911,526 | 3/1990 | Hsu et al. | 385/115 |
| 4,960,317 | 10/1990 | Briggs et al. | 385/56 |
| 4,989,606 | 2/1991 | Gehrich et al. | 128/637 |
| 5,005,939 | 4/1991 | Arvanitakis et al. | 385/53 |
| 5,007,704 | 4/1991 | McCartney | 385/56 |
| 5,015,059 | 5/1991 | Booth et al. | 385/49 |
| 5,016,968 | 5/1991 | Hammond et al. | 385/78 |
| 5,018,316 | 5/1991 | Mulholland et al. | 51/216 R |
| 5,044,755 | 9/1991 | Landa et al. | 385/115 |
| 5,069,524 | 12/1991 | Watanabe et al. | 385/59 |

OTHER PUBLICATIONS

"Amphenol—A World Leader In Interconnects Today and Tomorrow, " Amphenol Corporation, Apr., 1989 (portions dated earlier than Apr., 1989); particularly pp.7-18 of section entitled Amphenol Fiber Optic Designer's Handbook; section entitled Multichannel Connectors; and section entitled Multi Mode Couplers.

"Amphenol SMA Connector Termination Procedure, " Amphenol Corporation, Jul. 1988.

*Primary Examiner*—Brian Healy
*Attorney, Agent, or Firm*—Guy McClung

[57] ABSTRACT

Methods and apparatuses for securely aligning a plurality of optical fiber pairs, including a connection device with a body having recesses therein for a fiber guide to which are mounted a plurality of optical fibers, a removable connector to which are mounted a corresponding plurality of fibers, and a movable locking member disposed in the body and which positively holds the connector in the body so that ends of pairs of fibers are aligned and the connector is securely disposed in the body; and a sensing system with a base unit and optical fibers which employs such a connection device.

17 Claims, 4 Drawing Sheets

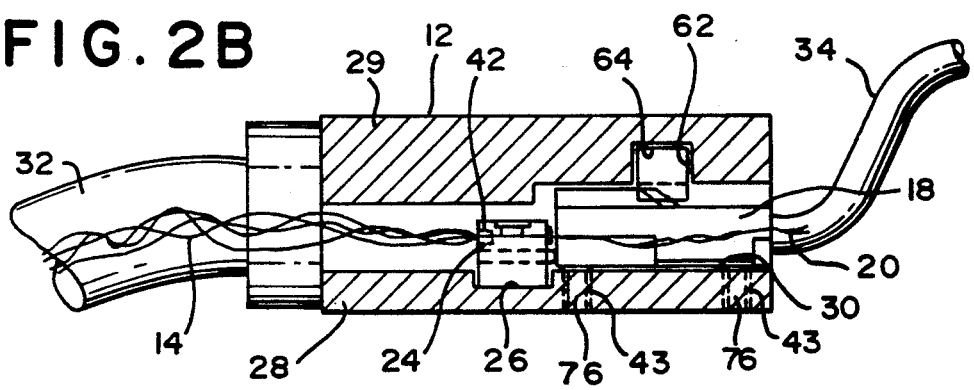
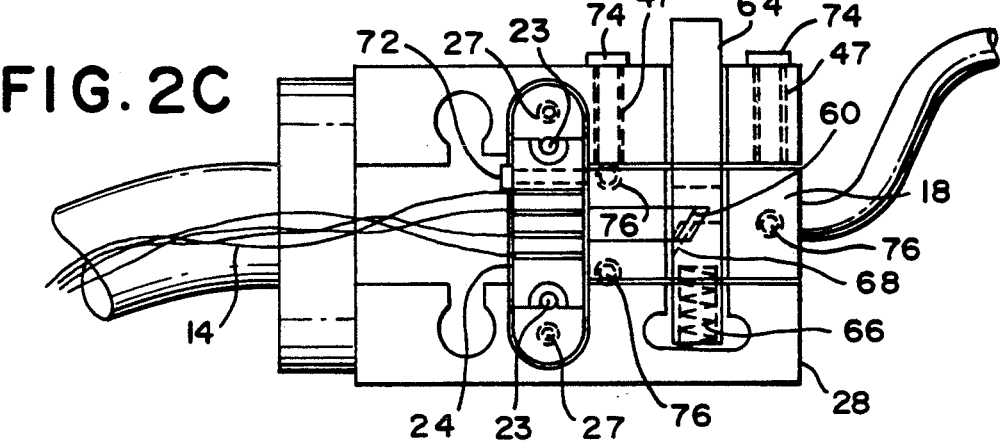
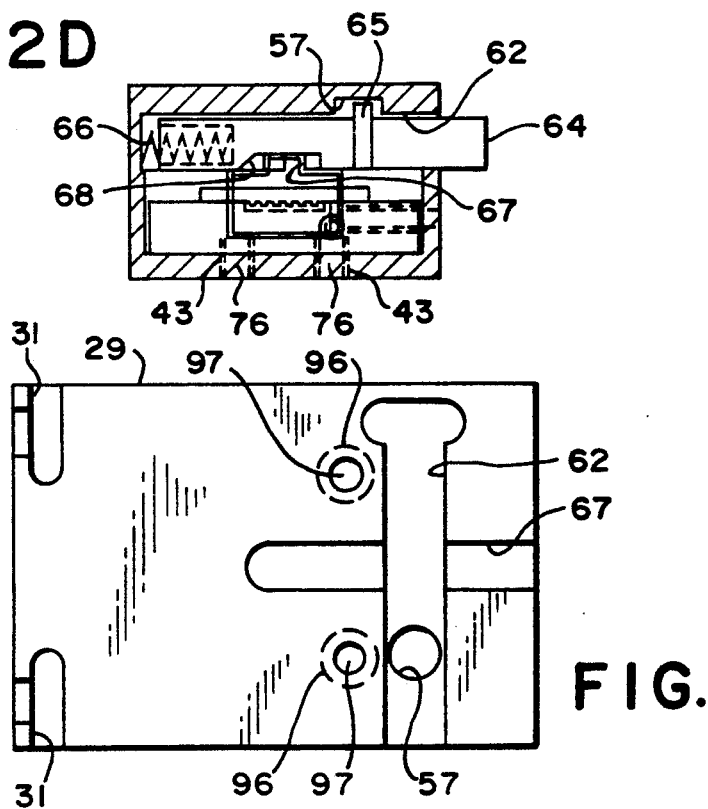

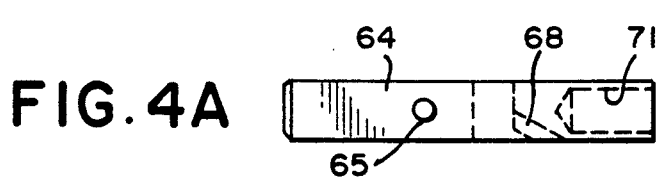
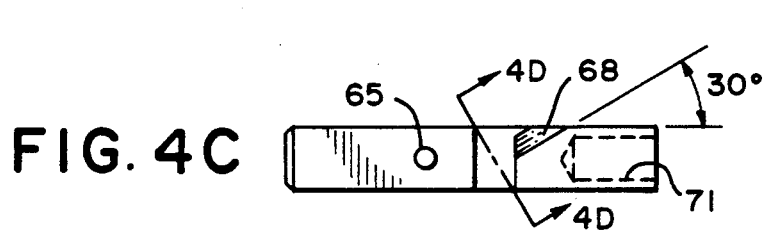
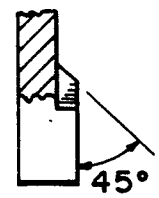
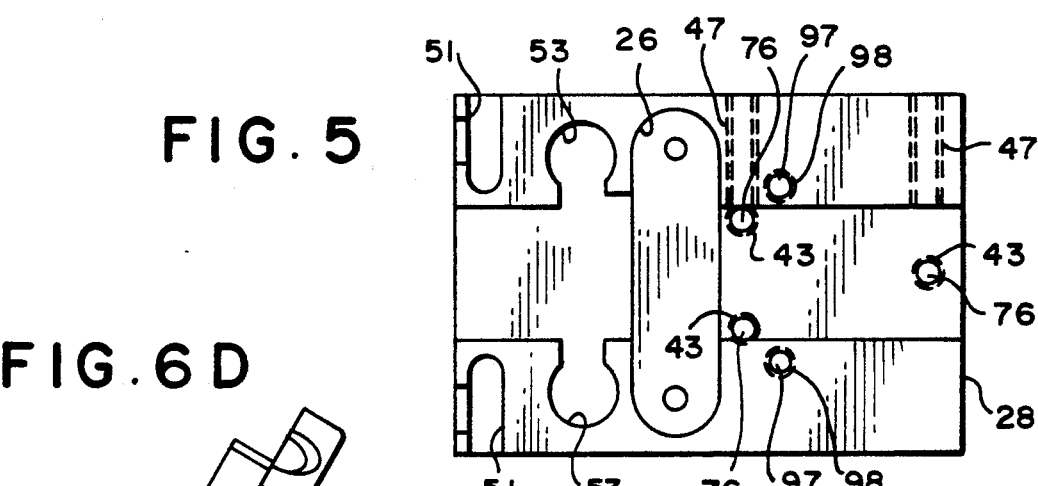
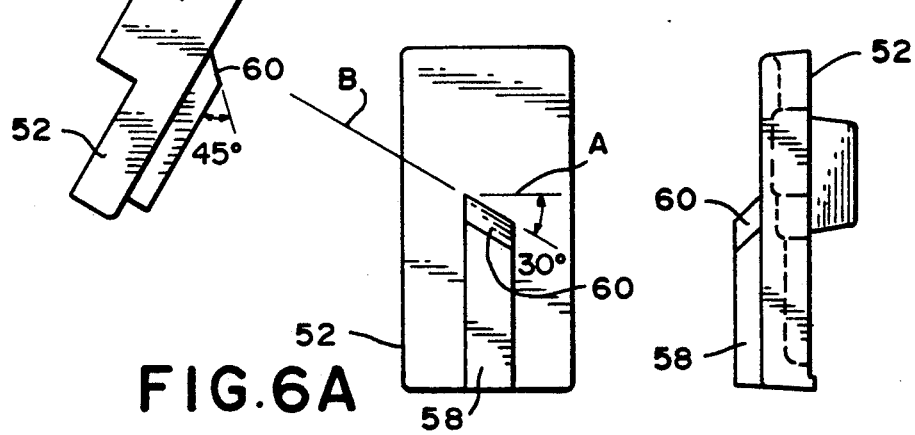
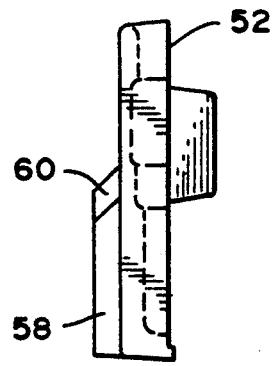
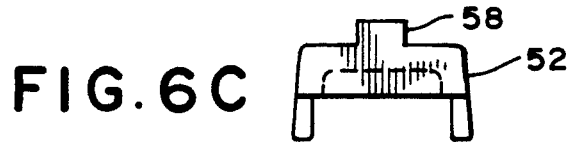

MULTI-CHANNEL OPTICAL FIBER CONNECTOR

BACKGROUND OF THE INVENTION

1. Field Of The Invention

This invention is directed to devices using optical fibers and to connectors for such fibers. In certain particular aspects this invention is directed to a connector which provides an aligned and stable interface for a plurality of optical fibers.

2. Description Of Related Art

An optical signal, e.g. a change in a light ray, conveyed by an optical fiber is an analog (as opposed to a digital) signal. The intensity, amplitude, phase, frequency, pulse width, time of flight, polarization, and wavelength of the light may vary.

Various instruments use optical fibers and sensing materials. Due to environmental changes (e.g. changes in heat, pressure, humidity, etc.) or changes upon contact by certain chemicals, a change is effected in the sensing materials which effects a change in light passing through the sensing materials. For these instruments to produce accurate measurements, i.e. accurate indications of the change, the transmitted light signal should be as unaffected as possible by extraneous influences, particularly over long periods of time. Stability problems are encountered with certain prior art male-female connectors, particularly when frequent plugging and unplugging are required. Also, it is possible for such connectors to be plugged together with the fiber ends somewhat laterally or longitudinally displaced, or non-parallel with respect to each other; at an undesired distance apart; or with their ends rotated with respect to each other at an undesired angle. Various prior art devices require mating ferrules or similar apparatus.

With certain prior art devices an optical fiber sensor interfaces with some type of near or remote controlling and/or monitoring and/or recording base system. In the past the fiber-fiber interface has lacked stability; i.e., due to the structure of items such as optical fiber mounts and connectors, the fibers have been permitted some degree of freedom of movement or have become skewed in position, resulting in an alteration and degradation of the light ray optical signal being transmitted by the fiber. When the signal conveyed is digital rather than analog, fiber-fiber interface stability is less of a problem. In highly sensitive analog measurements, however, e.g. the measurement of the concentration level of blood gases, even a minimal amount of mount or connector instability can result in degraded or useless measurements.

There has long been a need for a device which provides a stable fiber-fiber interface for optical fibers. There has long been a need for a stable two-part optical-fiber connector. There has long been a need for such a connector which can be used with two or more pairs of interfacing optical fibers. There has long been a need for an optical fiber connector which insures that fiber ends are disposed adjacent each other in a desired relative disposition, and in a desired proximity.

SUMMARY OF THE PRESENT INVENTION

The present invention teaches a connector for a plurality of optical fibers; for example, but not limited to, a connector for blood sensing system for measuring blood parameters which employs two or more optical fiber sensors which extend to one part of a connector which is secured to a second part of the connector, the second part of the connector having corresponding fibers extending to a base unit. In one embodiment a device according to this invention has: an integrated multi-fiber connector; a receptacle body for receiving and releasably holding the connector; and a fiber guide mounted in the receptacle body. Sensing fibers extends from the connector for sensing, e.g. for sensing blood parameters. Transmission fibers extend from the fiber guide to a base unit which monitors and/or measures signals from the sensing fibers transmitted through the transmission fibers. The fiber guide is secured in the receptacle body so that the transmission fibers are maintained substantially in position within the receptacle body. The integrated multi-fiber connector is securely held in place within the receptacle body so that the sensing fibers are aligned with the transmission fibers.

In one embodiment, stability of the connector with respect to the receptacle body and alignment of the fibers are achieved by providing a locking surface on the connector and a corresponding locking surface on a lock member. The lock member is movably mounted in the receptacle body and moves out of the way to permit entry of the connector into a receptacle body; then, by spring urging, the lock surface on the lock member moves against the lock surface on the connector to hold the connector in place. Preferably, the lock surfaces are configured and disposed so that the lock member lock surface urges the connector in three directions (e.g. along orthogonal x, y, z axes) to maintain the connector's position in a desired relationship with respect to the fiber guide so that the fibers of the guide and those of the connector are aligned. Stop members assure that the lock member moves the connector only a desired distance to a desired final location within the receptacle body. In the embodiment in which the lock member moves the connector in three directions, three stop arrangements are provided, one corresponding to each direction of movement. Precise positioning of the stop members and precise machining and configuration of the device components results in stability and in desired fiber alignment, thereby enhancing transmission of signals conveyed through the fibers.

In one embodiment a multi-fiber connector assembly according to this invention for interfacing a plurality of optical fibers in aligned pairs to facilitate the transmission of signals therethrough has a receptacle body with a connector recess therein, a fiber guide recess therein, and a locking member recess therein; a fiber guide secured in the fiber guide recess with a plurality o transmission optical fibers mounted thereto; a connector body removably securable in the connector recess with a plurality of sensing optical fibers mounted thereto; and a locking member movably mounted in the locking recess and movable to contact and urge the connector body into a position in the connector recess so that each of the sensing fibers is paired adjacent one of the transmission fibers and adjacent ends of each fiber pair are aligned for signal transmission therethrough.

In one embodiment of the present invention a sensing system employing fiber optics as sensing elements is provided which has a base unit for controlling light sent through the fiber optics and for monitoring light received through the fiber optics; transmission fiber optics extending from the base unit to a connector assembly; sensing fiber optics extending from the connector assembly to a sensor device; and the connector assembly has a multi-fiber connector assembly for interfacing a plurality of optical fibers in aligned pairs to facilitate the transmission of signals therethrough, the connector assembly having a receptacle body having a connector recess therein, a fiber guide recess therein, and a locking member recess therein, a fiber guide secured in the fiber guide recess with a plurality of transmission optical fibers mounted thereto, a connector body removably securable in the connector recess with a plurality of sensing optical fibers mounted thereto, and a locking member movably mounted in the locking recess and movable to contact and urge the connector body into a position in the connector recess so that each of the sensing fibers is paired adjacent one of the transmission fibers and adjacent ends of each fiber pair are aligned for signal transmission therethrough.

In one embodiment the fiber guide and the connector are molded or machined parts with precise grooves into which the fibers are positioned and then glued so that no fiber mounting devices such as ferrules are needed.

With appropriate positioning of the lock member, inadvertent removal of the connector from the receptacle body is prevented.

It is, therefore, an object of at least certain preferred embodiments of the present invention to provide new, useful, unique, efficient, and effective devices and methods for interfacing corresponding optical fibers.

Another object of at least certain preferred embodiments of the present invention is the provision of such devices and methods for connectors between fibers which are part of an optical sensor apparatus and fibers which extend to a base unit.

Yet another object of at least certain preferred embodiments of the present invention is the provision of such methods and devices in which the sensing fibers are mounted in a first member and the transmission fibers are mounted in a second member and the two members are secured with stability and so that the fibers are aligned for good signal transmission.

An additional object of at least certain preferred embodiments of the present invention is to provide such devices in which fibers are mounted in precise grooves without the need for mounting apparatuses.

Another object of the present invention is the provision of such devices which can, in certain preferred embodiments, be miniaturized as compared to existing devices which employ separate mounting ferrules.

Yet another object of the present invention is the provision of such devices whose cost, in certain preferred embodiments, is greatly reduced when the parts are molded of plastic with little or no additional machining required; thus, resulting in parts which can be disposable.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 3 is a top view of a top part of the receptacle of FIG. 1.

FIG. 4A is a top view of a lock member as shown in FIG. 2C.

FIG. 4B is a side view of the lock member of FIG. 4A.

FIG. 4C is another top view of the lock member of FIG. 4A.

FIG. 4D is a partial view of the lock member along line 4D—4D of FIG. 4C.

FIG. 5 is a top view of a lower part of the body of FIG. 1.

FIG. 6A is a top view of a connector lid according to the present invention.

FIG. 6B is a first side view of the lid of FIG. 6A.

FIG. 6C is a front end view of the lid of FIG. 6A.

FIG. 6D is a second side view of the lid of FIG. 6A.

DESCRIPTION OF EMBODIMENTS PREFERRED

Figure 1:
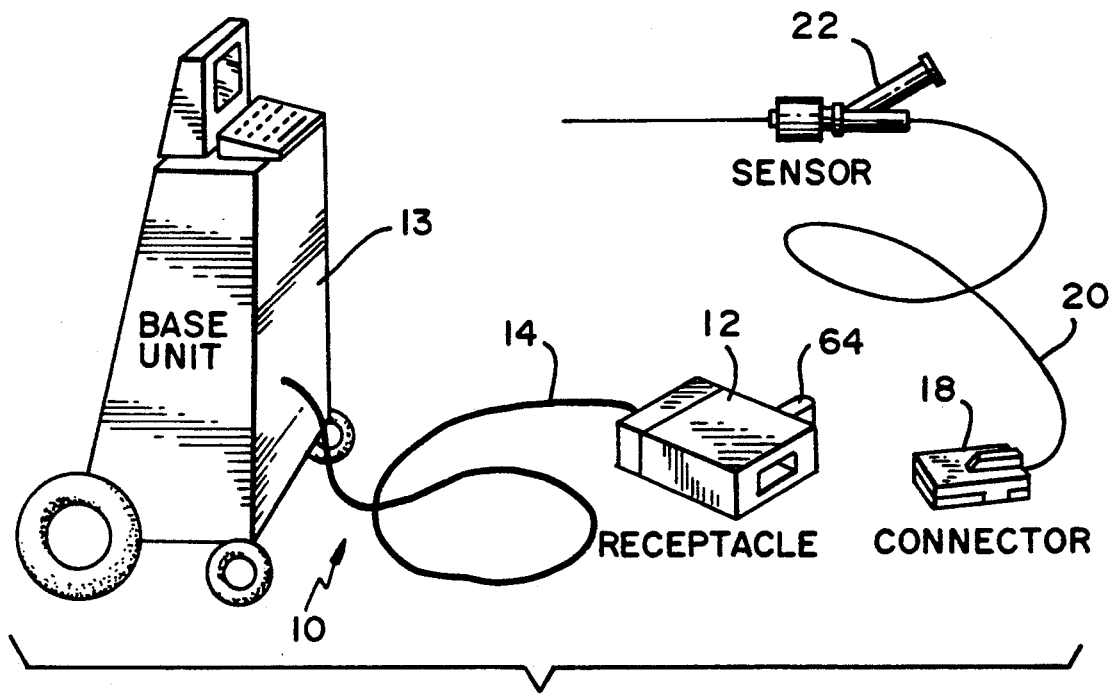
FIG. 1 is a perspective schematic view of a system according to the present invention, including a connection device which has a connector and a receptacle body which are shown apart. A fiber guide (not exposed) is within the receptacle.
Figure 2A:
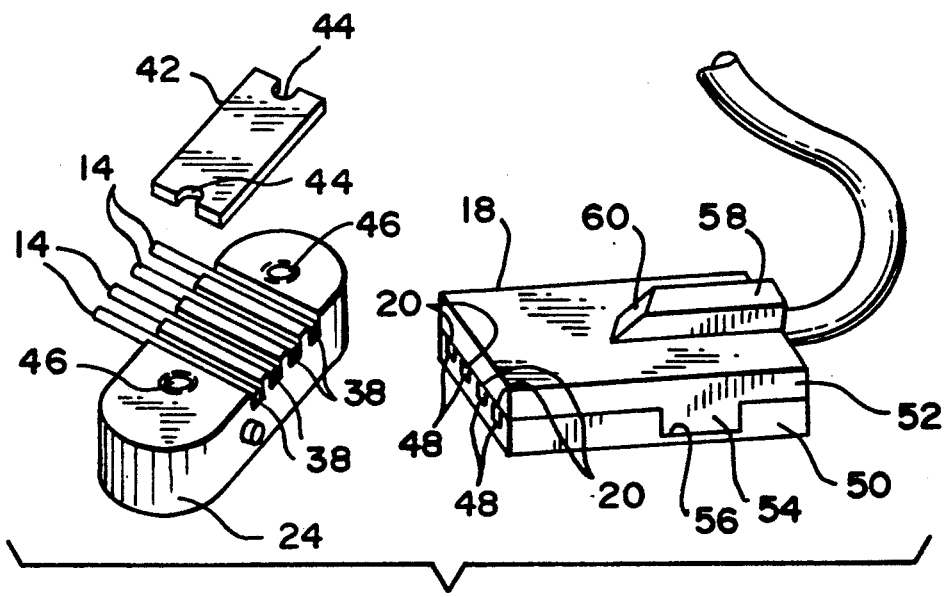
FIG. 2A is a perspective view of the fiber guide and connector of FIG. 1.

Referring now to FIG. 1, a system 10 according to the present invention includes a receptacle 12 from which a transmission optical fiber or fibers 14 extend to a base unit 13 and a connector 18 removably securable in the receptacle 12 and from which extend a sensing fiber element or elements 20 to a device 22, e.g. an arterial cannula for insertion in vivo into an artery. As shown in FIG. 2A, the transmission fibers 14 extend to and are mounted in a fiber guide 24 which is fixed (e.g.

by glue) in a fiber guide recess 26 (see FIG. 2B) in a lower body 28 of the receptacle 12. The connector 18 is removably disposed adjacent the fiber guide 24 in a connector recess 30 in the lower body 28. For clarity in FIG. 2A the fiber guide 24 and the connector 18 are shown spaced apart although in operation their final positions are such that they are very close together a set small precise distance apart, or in contact, with pairs of fiber ends aligned for signal transmission. The fibers 14 are surrounded by a harness or tubing 32 and the fibers 20 are surrounded by a harness or tubing 34.

As shown in FIG. 2A, each fiber 14 is mounted in a groove 38 in the fiber guide 24, preferably held in place with epoxy and a lid 42 is secured over the fiber guide 24 with screws (see screws 23, FIG. 2C) extending through recesses 44 in the lid 42 and into holes 46 in the fiber guide 24.

Also as shown in FIG. 2A, the connector 18 has grooves 48 in each of which are mounted one of the sensing element fibers 20 which are, preferably, held in place with epoxy. The connector 18 includes a connector body 50 and a connector lid 52 which has a protruding portion 54 received and held in a recess 56 in the body 50. A ridge 58 extends upwardly from the top of the lid 52 and has a locking surface 60 for coaction with a locking member 64 (FIG. 2C). Transmission fibers are, preferably, larger in diameter than sensing fibers.

Figure 2A:
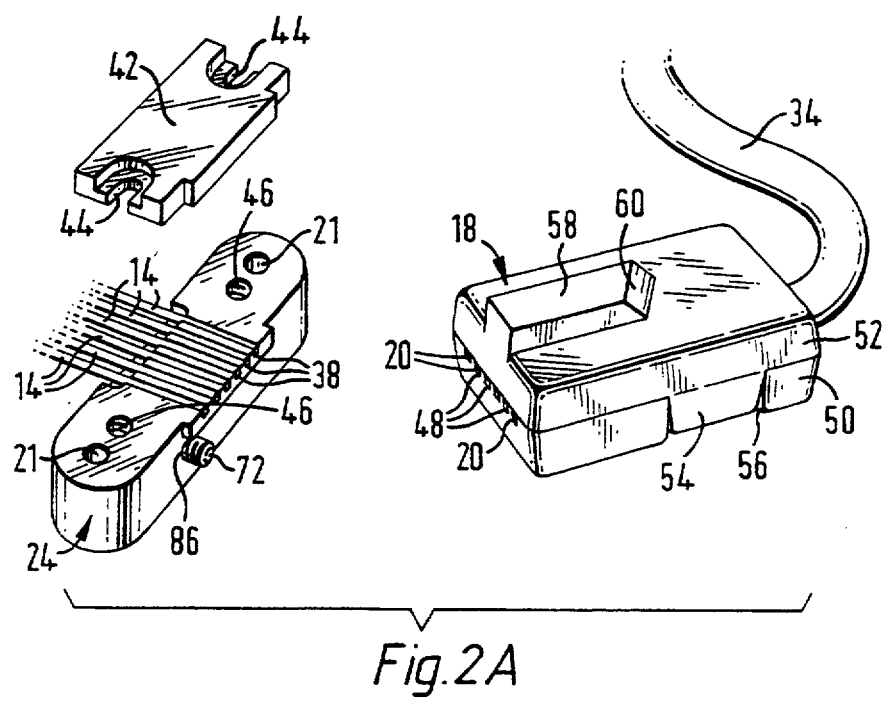
Figure 2B:
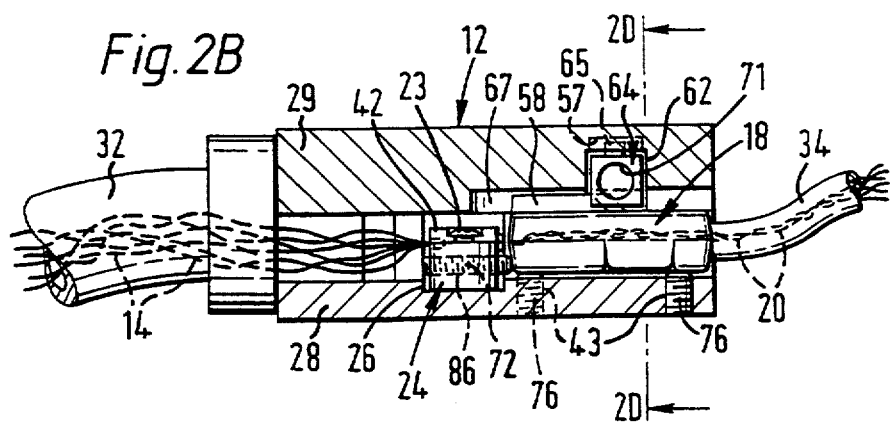
FIG. 2B is a side cross-sectional view of the connector of FIG. 1 within the receptacle.
Figure 2C:
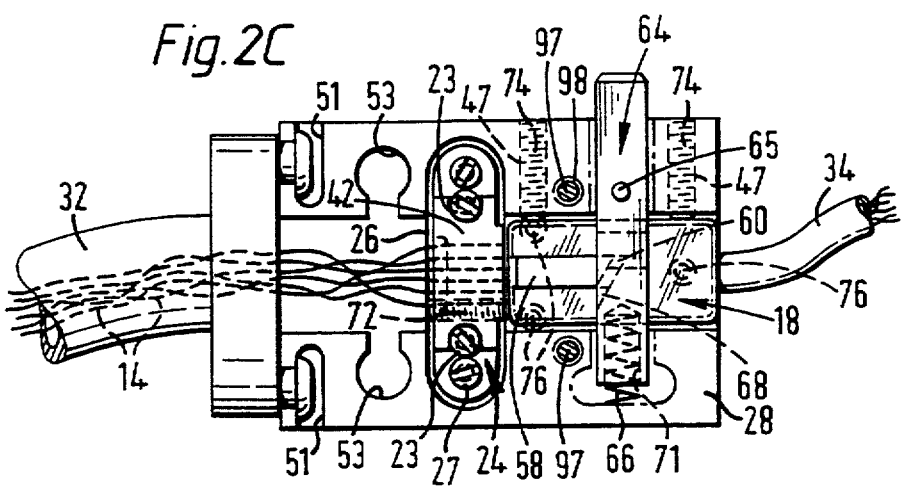
FIG. 2C is a top view of the device of FIG. 2A with a top part removed and showing a locking member, connector and fiber guide.
Figure 2D:
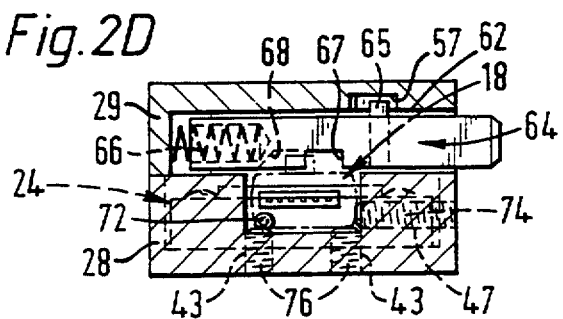
FIG. 2D is an end cross-sectional view of the device of FIG. 2C.

FIG. 2B shows the receptacle lower body 28 and an upper body 29 with a locking member recess 62. A locking member 64 is disposed in the recess 62. A spring 66 urges the locking member 64 out of the recess 62 and a stop 65 coacting with walls of a hole 57 prevents the locking member 64 from completely exiting the body 29. The locking member 64 has a locking member surface 68 which co-acts with the locking surface 60 of the lid 52. The disposition, configuration, and co-action of the surfaces 60 and 68 results, preferably, in the urging of the connector 18 in three orthogonal directions within the receptacle 12. Movement in these three directions is restricted as desired by stop member 72, stops 74, and stops 76. The stops 74 are preferably threaded bolts which are threadedly received in holes 47 in the lower receptacle body part 29. When the connector 18 is in place in the receptacle 12, coaction of the locking member 64 and the ridge 58 pushes the connector 18 against the stops 74. Thus, positioning of the stops 74 as desired insures the position, in one axis, of the connector 18. Similarly, holes 43 (FIGS. 2B, 2D, 5) receive stop members 76 and the downward movement (as viewed in FIG. 2B) of the connector 18 is limited by the three stops 76. By providing three stops 76, tilting of the connector 18 is prevented. The stop member 72 is disposed in a hole 86 in the fiber guide 24 (see FIGS. 2C and 8A) and insures that a desired gap is maintained between the fiber guide 24 and the connector 18 (in those embodiments in which a gap is desired).

FIG. 3 shows the upper body 29 of the receptacle 12 having grooves 31 through which may pass bolts or screws for attachment to a harness. The ridge 58 of the connector 18 is received in and movable in a track recess 67.

FIGS. 4A-4D show a locking member 64 with its angled locking surface 68 and a recess 71 into which an end of the spring 66 is inserted. In the embodiment shown, the surface 68 is angled 30 degrees from the top edge of the locking member 64 as shown in FIG. 4C and 45 degrees from the side edge as shown in FIG. 4D.

FIG. 5 shows a lower body 28 of the receptacle 12 having grooves 51 (like the grooves 31 of the upper body 29, FIG. 3) for facilitating the mounting of the receptacle to a harness or tubing. Recesses 53 may be used to receive and hold an end of a tension yarn (not shown) used in fiber optic cables. Screws or bolts 97 extend through holes 96 (FIG. 3) in the upper body 29 and through holes 98 in the lower body 28 to secure the two body pieces together.

FIGS. 6A-6D show the lid 52 for the connector 18 (as shown in FIG. 2A). In the embodiment shown in FIGS. 6A-6D, the locking surface 60 is angled 30 degrees from a centerline A as shown and 45 degrees from a normal line B as shown to correspond to the locking member surface 68 of the locking member 64. This dual angling of the surfaces 60 and 68 provides for the pushing or urging of the connector lid in three orthogonal axes until appropriate stops are contacted to position the connector and fiber guide with respect to each other, thereby positioning pairs of optical fibers in substantial alignment. Although such urging in three directions is most preferred, urging in one or two directions is within the scope of this invention.

Figure 7A:
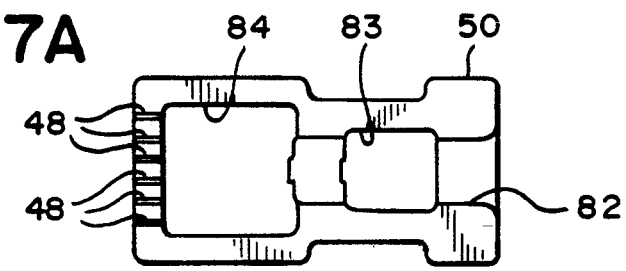
FIG. 7A is a top view of a connector body according to the present invention.
Figure 7B:
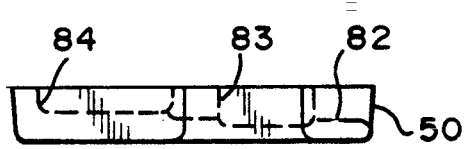
FIG. 7B is a side view of the of FIG. 7A.

FIGS. 7A and 7B show the body 50 of the connector 18 having an entry hole 82 for a tubing or harness, a widened recess 83 for receiving an enlarged part (not shown) of a tubing or harness, and a fan-out recess 84 in which fibers fan-out from an end of a harness or tubing and extend to the grooves 48.

Figure 8A:
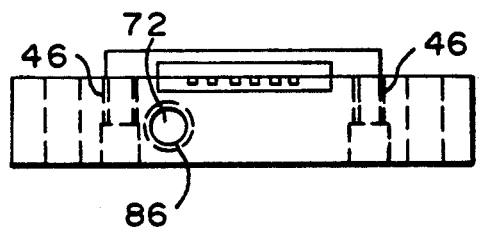
FIG. 8A is a front end view of the fiber guide of FIG. 2A.
Figure 8B:
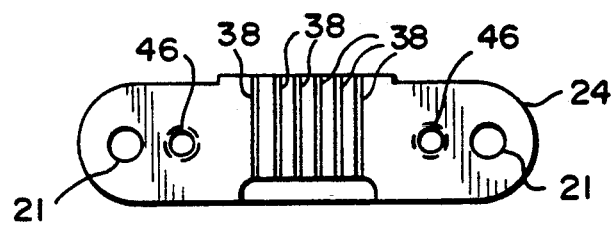
FIG. 8B is a top view of the fiber guide of FIG. 8A.
Figure 8C:
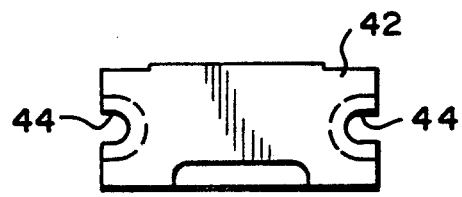
FIG. 8C is a top view of a plate securable to the fiber of FIG. 8B.

FIGS. 8A-8C show the fiber guide 24 and its grooves 38 for receiving and holding fibers. The stop member 72 extends through a hole 86 in the fiber guide 24. The fiber guide 24 is held in place in the recess 26 (see FIGS. 2B, 2C) by screws 27 (see FIG. 2C) extending through holes 21 in the fiber guide 24.

Figure 9:
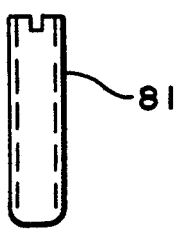
FIG. 9 is a side view of a stop member used with a device according to the present invention.
Figure 1:
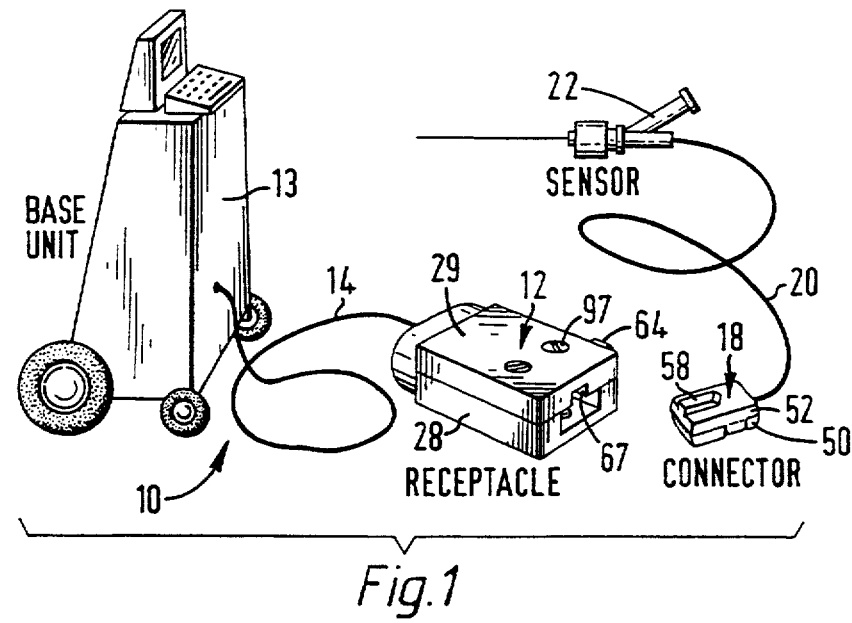

FIG. 9 shows a typical stop member 81. Each of the stops 72, 74, 76 is, preferably, like stop member 81.

Typical optical fibers useful with devices according to this invention are about 125 microns in diameter and typical grooves in fiber guides and connector bodies are between 5 and 6 mils. Fibers are, preferably, polished for optical clarity. By, preferably, potting the fibers in their grooves, e.g. with epoxy, no ferrules, O-rings or connectors (e.g. screws or bolts) are needed.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

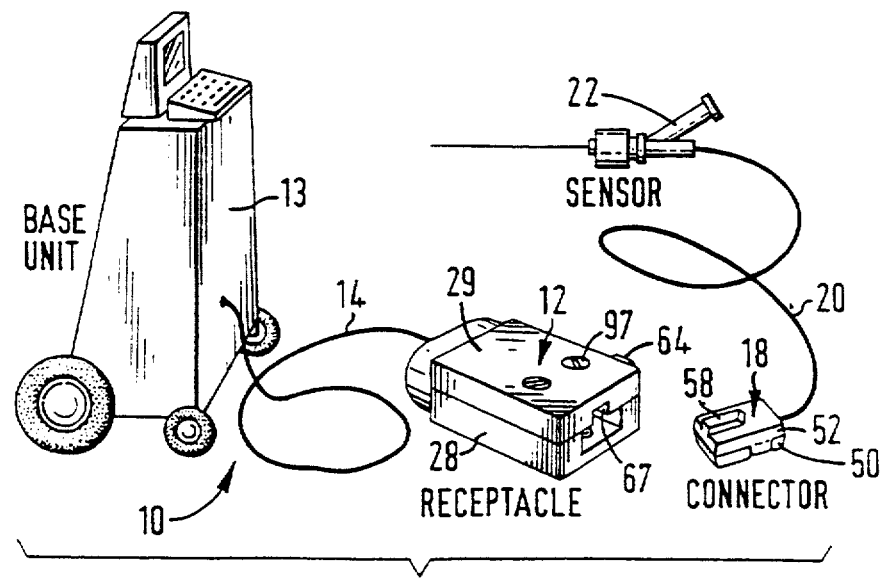

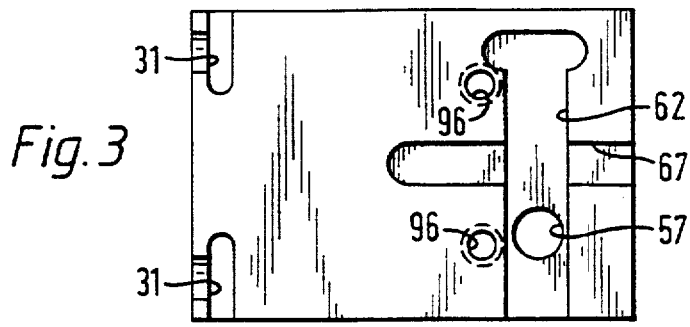
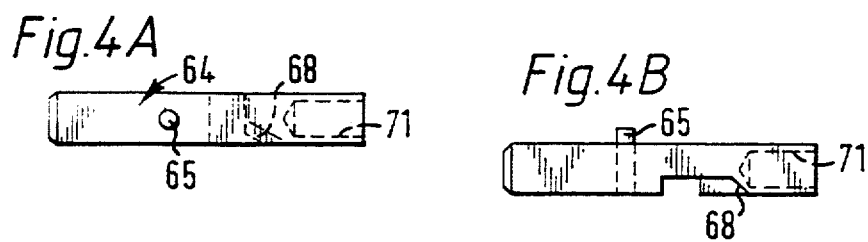
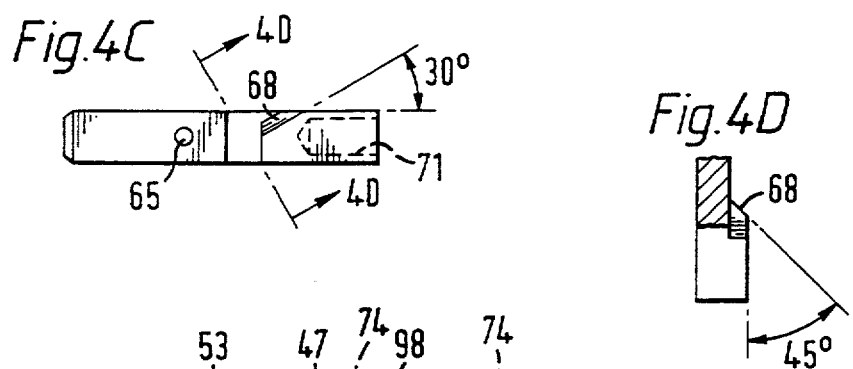
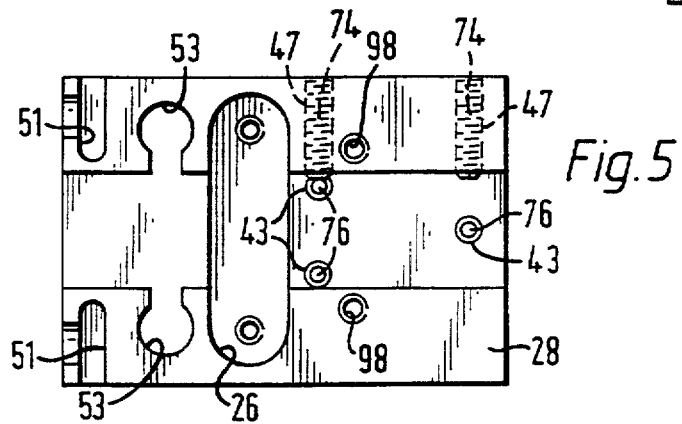

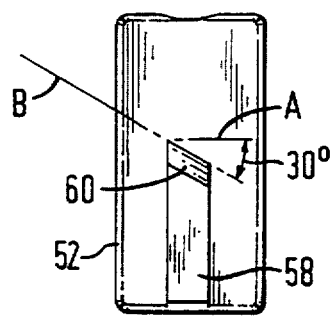
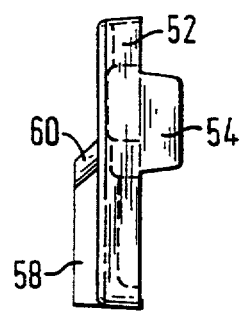
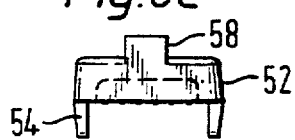
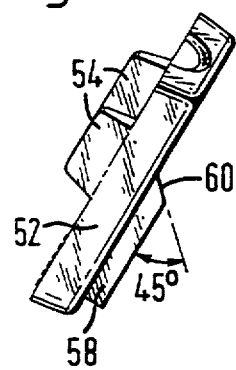
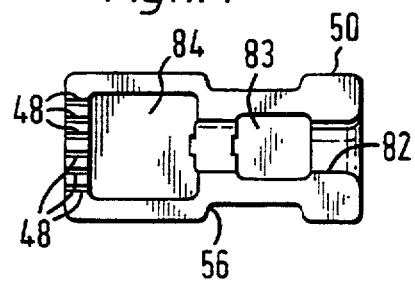
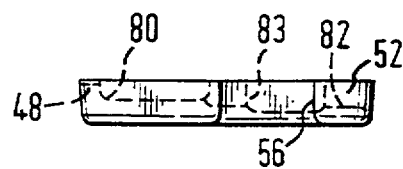

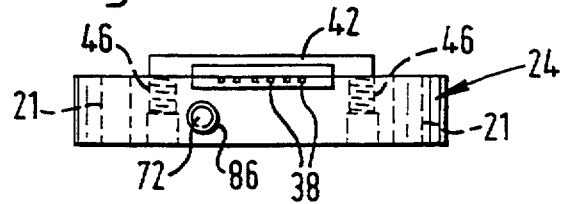
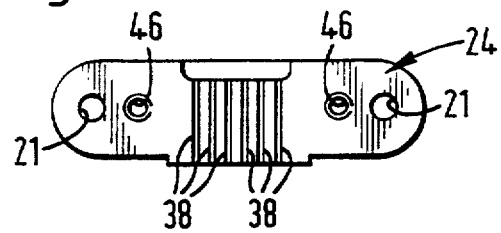
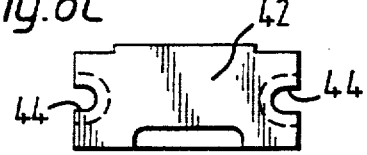
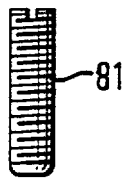

What is claimed is:

1. A multi-fiber connector assembly for interfacing a plurality of optical fibers in aligned pairs to facilitate the transmission of signals therethrough, the assembly comprising a receptacle body having a connector recess therein, a fiber guide recess therein, and a locking member recess therein, a fiber guide secured in the fiber guide recess with a plurality of transmission optical fibers mounted thereto, a connector body removably securable in the connector recess with a plurality of sensing optical fibers mounted thereto, and a locking member movably mounted in the locking recess and movable to contact and urge the connector body into a position in the connector recess so that each of the sensing fibers is paired adjacent one of the transmission fibers and adjacent ends of each fiber pair are aligned for signal transmission therethrough.

2. The connector assembly of claim 1 wherein the transmission optical fibers are secured in grooves in the fiber guide, one fiber in each groove, and the sensing optical fibers are secured in grooves in the connector body, one fiber in each groove.

3. The connector assembly of claim 2 wherein epoxy alone secures the fibers in their respective grooves.

4. The connector assembly of claim 1 wherein the connector body has a portion with a first locking surface contactable by a second locking surface of the locking member, the locking surfaces angled correspondingly so that the locking member urges the connector body in three orthogonal directions to stabilize the connector body within the receptacle body and to align the fibers of each fiber pair.

5. The connector assembly of claim 1 wherein stop means are provided in and through the receptacle body for limiting movement of the connector body resulting from urging of the connector body by the locking member.

6. The connector assembly of claim 4 wherein stop means are provided in the assembly for limiting movement of the connector body in each of the three orthogonal directions.

7. The connector assembly of claim 1 wherein the transmission optical fibers are larger in diameter than the sensing optical fibers.

8. The connector assembly of claim 1 wherein a tracking recess is provided in the receptacle body for receiving a protruding portion of the connector body to facilitate correct insertion of the connector body into the receptacle body.

9. The connector assembly of claim 1 wherein a spring is disposed between the locking member and a wall of the receptacle body, the spring urging the locking member outwardly, and a stop member extending from the locking member is disposed in a stop member recess in the receptacle body, the stop member contacting a wall of the stop member recess to prevent the spring from moving the locking member completely out of the receptacle body.

10. The connector assembly of claim 9 wherein a spring recess in the locking member receives and holds a portion of the spring.

11. The connector assembly of claim 2 wherein the connector body comprises a lower body member and an upper lid, the lower body member having a recess for receiving a protruding portion of the upper lid thereby providing correct position of the lower body member with respect to the lid, and the lid disposable above the grooves in which are disposed the sensing optical fibers to close off a top opening of each groove.

12. The connector assembly of claim 2 wherein the receptacle body comprises an upper part and a lower part, the lower part having the fiber guide recess therein, and a fiber guide lid securable on the fiber guide to close off top openings of the grooves in which are disposed the transmission optical fibers.

13. The connector assembly of claim 1 wherein the receptacle body comprises a top part and a bottom part, the top part having the locking member recess therein, the connector recess formed by a first sub-recess in the top part and a second sub-recess in the bottom part, and the top part having a tracking recess therein for receiving and guiding a protruding portion of the connector body to facilitate correct insertion of the connector body into the receptacle body.

14. A multi-fiber connector assembly for interfacing a plurality of optical fibers in aligned pairs to facilitate the transmission of signals therethrough, the assembly comprising a receptacle body having a connector recess therein, a fiber guide recess therein, and a locking member recess therein, a fiber guide secured in the fiber guide recess with a plurality of transmission optical fibers mounted thereto, the transmission optical fibers secured in grooves in the fiber guide, one fiber in each groove, a connector body removably securable in the connector recess with a plurality of sensing optical fibers mounted thereto, the sensing optical fibers secured in grooves in the connector body, one fiber in each groove, the connector body having a first locking surface, a locking member movably mounted in the locking recess and movable to contact and urge the connector body into a position in the connector recess so that each of the sensing fibers is paired adjacent one of the transmission fibers and adjacent ends of each fiber pair are aligned for signal transmission therethrough, the locking member having a second locking surface, the connector body's first locking surface contactable by the second locking surface of the locking member, the locking surfaces angled correspondingly so that the locking member urges the connector body in three orthogonal directions to stabilize the connector body within the receptacle body and to align the fibers of each fiber pair, and stop means in and through the receptacle body for limiting movement of the connector body resulting from urging of the connector body by the locking member, the stop means limiting movement of the connector body in each of the three orthogonal directions.

15. The connector assembly of claim 14 wherein a tracking recess is provided in the receptacle body for receiving a protruding portion of the connector body to facilitate correct insertion of the connector body into the receptacle body, a spring is disposed between the locking member and a wall of the receptacle body, the spring urging the locking member outwardly, and a spring recess in the locking member receives and holds a portion of the spring, a stop member extending from the locking member is disposed in a stop member recess in the receptacle body, the stop member contacting a wall of the stop member recess to prevent the spring from moving the locking member completely out of the receptacle body, the connector body comprises a lower body member and an upper lid, the lower body member having a recess for receiving a protruding portion of the upper lid thereby providing correct position of the lower body member with respect to the lid, and the lid disposable above the grooves in which are disposed the sensing optical fibers to close off a top opening of each groove, the receptacle body comprises an upper part and a lower part, the lower part having the fiber guide recess therein, and a fiber guide lid securable on the fiber guide to close off top openings of the grooves in which are disposed the transmission optical fibers, the upper part having the locking member recess therein, the connector recess formed by a first sub-recess in the upper part and a second sub-recess in the lower part, and the upper part having a tracking recess therein for receiving and guiding a protruding portion of the connector body to facilitate correct insertion of the connector body into the receptacle body.

16. A sensing system employing fiber optics as sensing elements, the sensing system comprising a base unit for controlling light sent through the fiber optics and for monitoring light received through the fiber optics, transmission fiber optics extending from the base unit to a connector assembly, sensing fiber optics extending from the connector assembly to a sensor device, the connector assembly comprising a multi-fiber connector assembly for interfacing a plurality of optical fibers in aligned pairs to facilitate the transmission of signals therethrough, the assembly comprising a receptacle body having a connector recess therein, a fiber guide recess therein, and a locking member recess therein, a fiber guide secured in the fiber guide recess with a plurality of transmission optical fibers mounted thereto, a connector body removably securable in the connector recess with a plurality of sensing optical fibers mounted thereto, and a locking member movably mounted in the locking recess and movable to contact and urge the connector body into a position in the connector recess so that each of the sensing fibers is paired adjacent one of the transmission fibers and adjacent ends of each fiber pair are aligned for signal transmission therethrough.

17. The sensing system of claim 16 wherein the connector body has a first locking surface, the locking member has a second locking surface, the locking surfaces angled correspondingly so that the locking member urges the connector body in three orthogonal directions to stabilize the connector body within the receptacle body and to align the fibers of each fiber pair, and stop means in and through the receptacle body for limiting movement of the connector body resulting from urging of the connector body by the locking member, the stop means limiting movement of the connector body in each of the three orthogonal directions.

* * * * *

UNITED STATES PATENT AND TRADEMARK OFFICE
CERTIFICATE OF CORRECTION

PATENT NO. : 5,159,654

DATED : October 27, 1992

INVENTOR(S) : James R. Salter

It is certified that error appears in the above-identified patent and that said Letters Patent is hereby corrected as shown below:

The Title page should be deleted and substitute therefor the attached Title page.

Delete drawing sheets 1-5 and subsitutute therefor the drawing sheets consisting of Figs. 1-5 as shown on the attached sheets.

Signed and Sealed this

Tenth Day of January, 1995

BRUCE LEHMAN

*Attest:*

*Attesting Officer*     *Commissioner of Patents and Trademarks*

United States Patent [19]
Salter

[11] Patent Number: 5,159,654
[45] Date of Patent: Oct. 27, 1992

[54] MULTI-CHANNEL OPTICAL FIBER CONNECTOR

[75] Inventor: James R. Salter, The Woodlands, Tex.

[73] Assignee: Optex Biomedical, Inc., The Woodlands, Tex.

[21] Appl. No.: 782,557

[22] Filed: Oct. 25, 1991

[51] Int. Cl.⁵ .............................................. G02B 6/26
[52] U.S. Cl. .................................... 385/59; 385/55; 385/12; 385/65; 385/71; 385/139
[58] Field of Search ...................... 385/54, 55, 59, 71, 385/65, 12, 136, 137; 250/227.11, 227.14; 356/40, 41, 39

[56]         References Cited
         U.S. PATENT DOCUMENTS

| | | | |
|---|---|---|---|
| 4,016,761 | 4/1977 | Rozzell et al. | 250/227.11 |
| 4,140,367 | 2/1979 | Makuch et al. | 385/59 |
| 4,214,812 | 7/1980 | de Mendez | 385/65 |
| 4,277,135 | 7/1981 | Schrott et al. | 385/75 |
| 4,279,468 | 7/1981 | Turley et al. | 385/59 |
| 4,323,300 | 4/1982 | Stewart et al. | 385/59 |
| 4,405,201 | 9/1983 | Cefarelli et al. | 385/59 |
| 4,611,877 | 9/1986 | Glover et al. | 385/71 |
| 4,684,245 | 8/1987 | Goldring | 356/41 |
| 4,697,593 | 10/1987 | Evans et al. | 356/41 |
| 4,756,507 | 7/1988 | Hahn et al. | 385/117 |
| 4,759,599 | 7/1988 | Yamaguchi et al. | 385/59 |
| 4,778,243 | 10/1988 | Finzel | 385/55 |
| 4,779,952 | 10/1988 | Hayashi et al. | 385/66 |
| 4,794,619 | 12/1988 | Tregay | 385/12 |
| 4,818,059 | 4/1989 | Kakii et al. | 385/65 |
| 4,822,997 | 4/1989 | Fuller et al. | 250/227.11 |
| 4,824,204 | 4/1989 | Pafford | 385/73 |
| 4,836,638 | 6/1989 | Finzel | 385/59 |
| 4,872,736 | 10/1989 | Myers et al. | 385/60 |
| 4,892,383 | 1/1990 | Klainer et al. | 385/12 |
| 4,906,837 | 3/1990 | Doneen et al. | 385/12 X |
| 4,907,857 | 3/1990 | Giuliani et al. | 385/12 |
| 4,911,526 | 3/1990 | Hsu et al. | 385/115 |
| 4,960,317 | 10/1990 | Briggs et al. | 385/56 |
| 4,989,606 | 2/1991 | Gehrich et al. | 128/637 |
| 5,005,939 | 4/1991 | Arvanitakis et al. | 385/53 |
| 5,007,704 | 4/1991 | McCartney | 385/56 |
| 5,015,059 | 5/1991 | Booth et al. | 385/49 |
| 5,016,968 | 5/1991 | Hammond et al. | 385/78 |
| 5,018,316 | 5/1991 | Mulholland et al. | 51/216 R |
| 5,044,755 | 9/1991 | Landa et al. | 385/115 |
| 5,069,524 | 12/1991 | Watanabe et al. | 385/59 |

OTHER PUBLICATIONS

"Amphenol—A World Leader In Interconnects Today and Tomorrow," Amphenol Corporation, Apr., 1989 (portions dated earlier than Apr., 1989); particularly pp.7-18 of section entitled Amphenol Fiber Optic Designer's Handbook; section entitled Multichannel Connectors; and section entitled Multi Mode Couplers.

"Amphenol SMA Connector Termination Procedure," Amphenol Corporation, Jul. 1988.

Primary Examiner—Brian Healy
Attorney, Agent, or Firm—Guy McClung

[57]                ABSTRACT

Methods and apparatuses for securely aligning a plurality of optical fiber pairs, including a connection device with a body having recesses therein for a fiber guide to which are mounted a plurality of optical fibers, a removable connector to which are mounted a corresponding plurality of fibers, and a movable locking member disposed in the body and which positively holds the connector in the body so that ends of pairs of fibers are aligned and the connector is securely disposed in the body; and a sensing system with a base unit and optical fibers which employs such a connection device.

17 Claims, 4 Drawing Sheets